3,150,091
ESTER LUBRICANT CONTAINING TITANIUM
POLYMER
David W. Young, Homewood, and Eileen M. Pare, Park Forest, Ill., assignors, by mesne assignments, to Sinclair Research Inc., New York, N.Y., a corporation of Delaware
No Drawing. Filed May 6, 1959, Ser. No. 811,294
3 Claims. (Cl. 252—42.7)

This invention is drawn to a method for making oil-compatible organo-titanium polymers from ortho-titanium salts or esters and to lubricants which contain these polymers. The method involves the use of combined water, that is, the method uses a mixture containing water, generally as the minor component. Such a mixture may be a solution of water in alcohol or other solvent vehicle, or a suspension of water in a liquid wherein water is not soluble. The combined water may also be in a solid solution, that is, it may be the water of hydration of an organic or inorganic salt.

The method of this invention provides for ready control of the properties of the titanium polymer by controlling the reaction conditions, especially by varying the proportion of water, so that the product polymer may be varied at will from a slightly viscous liquid to a solid. For example, the polymer obtained with 0.5 molequivalent of water per molequivalent of titanium tetrachloride is a viscous liquid soluble in alcohol and hydrocarbons and having a molecular weight of about 680, approximately that of the dimer. The polymer obtained with 1.0 molequivalent of water is a plastic solid, insoluble in ethyl alcohol but soluble in hydrocarbons, and having a molecular weight of about 1400.

The titanium polymers which are produced by this invention are compatible, i.e. soluble, miscible or dispersible, with certain lubricants, for example, synthetic-ester based lubricants. Tests show the titanium polymer to be effective in giving increased extreme pressure properties to lubricants which contain it.

The polymer may be produced in one processing step from a titanium halide, an alcohol and water. Alternatively, the polymer may be produced by water addition to a titanium tetraester of the type $Ti(OR)_4$ where R is an alkyl group of 1–12 carbon atoms. In the past, titanium polymers have been produced by the polymerization, through heating, or through water addition and heating, of tetraalkoxy titanates, especially the glycol titanates produced by transesterification of an alkoxy titanate with a glycol, as described, for example, in U.S. Patent 2,643,262. Since the titanium tetraester used as a starting material for the manufacture of titanate polymers requires several processing steps to be made from $TiCl_4$ the advantages of the one-step embodiment of this process to obtain titanium polymers are apparent, while the process of this invention offers, in general, good control over the final characteristics of the polymer product.

The preferred titanium starting material for the process of this invention is a titanium tetrahalide. The halide may, for instance, be derived from a halogen having an atomic number from 17 to 53, that is, chlorine, bromine or iodine. A mixture of titanium halides may be used, as may a mixed halide, such as $TiBr_2Cl_2$ and even a titanyl halide, such as $TiOCl_2$. $TiCl_4$ is preferred from the standpoint of availability and economy.

The alcohol which contributes the R group in a $Ti(OR)_4$ starting material or which is used with the water and halide to produce a polymer in one step, has 1–12 carbon atoms and may be straight, branched or cyclic, saturated or unsaturated. Preferably the alcohol is one which is at least to some extent soluble or miscible with water and yet which when reacted forms a titanium polymer which is soluble in the synthetic ester lubricant in which it is to be used. The preferred alcohols are aliphatic saturated monohydroxy alcohols of 3 to 10 carbon atoms, such as butanol, 2-ethylhexanol, etc. Generally, about 0.25 to 4 moles of alcohol take part in the reaction with each mole of the titanium halide. Preferably at least about 1–3 moles of alcohol are reacted. The total amount of alcohol used can be determined by the quantity of water which is to be supplied, enough alcohol containing the water being used to give the desired results. The alcohol which does not react, that is, the alcohol which is used merely as a vehicle for water addition is conveniently distilled from the formed polymer.

The amount of water used in forming the polymer is about 0.25 to 2 moles per mole of titanium compound, preferably about 0.25 to 0.75. The water, as explained above, is combined, and may be conveniently supplied as a solution, say of about 0.5 to 10%, preferably about 1–8% in alcohol. Also, as explained above, the diluted or combined water may take the form of a hydrated salt which may be added to the titanium salt or ester to form the polymer. The salt chosen will be influenced by economic considerations but should be one which is easily dehydrated. Epsom salt ($MgSO_4.7H_2O$), and similar solids are suitable vehicles for water addition. Although water may be added straight to the reaction mixture, even slow addition of water alone, so that it acts as if in a vehicle or as if combined, makes the reaction difficult to control to produce exactly the desired characteristics in the polymer product. Either the alcohol or the salt may be used as a vehicle to dilute the water in either embodiment of the invention; for instance, where the hydrolysis is performed upon the ester, alcohol may be used as a vehicle, and where alcohol is used for reaction with the halide, the hydrated salt may serve as the vehicle for water addition.

The reaction to form the polymer is best carried out in an inert hydrocarbon solvent such as hexane, which is usually present in amounts of about 10 to 50% based on the weight of the titanium material; i.e., the weight of the ester or the combined weight of the titanium salt and alcohol. The reaction proceeds readily at any temperature of at least about 0° C. and below the decomposition temperature of the reactants. A range of about 15 to 70° C. is acceptable and room temperature, i.e. about 20–40° C. is preferred. Ammonia may be added during the reaction at a rate just sufficient to neutralize the hydrohalic acid formed. The ammonium salt, e.g. $NH_4Cl$, precipitates from the reaction mass and may be filtered out of the product. Alternatively, the hydrogen halide may be removed as it is formed by continually purging the reaction mass with an inert gas such as nitrogen or by holding the mass under a vacuum. After the reaction, the solvent and excess alcohol may be removed conveniently by distillation under reduced pressure while the remains of the inorganic salt or other insolubles may be filtered out. Batches of our polymer have been prepared with yields of about 80% of polymer based on the titanium compound used.

Synthetic diester, complex ester and polyester materials are finding increased use as lubricants. These esters are prepared fundamentally by the action of acids on alcohols. The mere mixture of an alcohol and acid at the proper temperature will react to produce an equilibrium mixture which includes the mono-ester. The same is true for the reactions of organic dicarboxylic acids and glycols to produce synthetic lubricant polyester bright stocks. The diesters are frequently of the type alcohol-dicarboxylic acid-alcohol, while complex esters are generally of the type X—Y—Z—Y—X in which X represents a mono-alcohol residue, Y represents a dicarboxylic acid residue and Z represents a glycol residue and the linkages are ester linkages. These esters have been found to be especially adaptable to the conditions to which turbine engines are exposed, since they can be formulated to give a desirable combination of high flash point, low pour point, and high viscosity at elevated temperatures. In addition, many complex esters show good stability to shear which can be improved still further by the use of the Ti polymers.

Suitable mono and dicarboxylic acids used to make synthetic ester lubricant bases can be branched or straight chain and saturated or unsaturated and they contain from about 2 to 12 carbon atoms. Generally preferred acids are the saturated aliphatic dibasic acids which include, among others, succinic, adipic, diglycolic, suberic, azelaic, sebacic and "isosebacic" acids, which are mixtures of alpha-ethyl suberic acid, alpha-alpha'-diethyl adipic acid, and sebacic acid. The alcohols contain from 4 to 12 carbon atoms. The monohydric alcohols include, among others, butyl, hexyl, 2-ethylhexyl, dodecyl, cetyl and stearyl alcohols. The glycols and glycol ethers include ethylene glycol, propylene glycol, butylene glycol, triethylene glycol, diethylene glycol, ethylene glycol mono-2-ethyhexyl ether, diethylene glycol mono-n-butyl ether, propylene glycol mono-n-butyl ether, tripropylene glycol mono-ethyl ether, 2-ethyl-1,3-pentanediol, 2-ethyl-1,3-hexanediol, 2-isopropyl-1,3-hexanediol, etc. In general the useful glycols include the aliphatic monoglycols of 4 to 20 or 30 carbon atoms, preferably 4 to 12, and the polyglycols having from about 1 to 50 ether oxygen atoms obtained from monoglycols of 2 to 12 carbon atoms. Advantageously, the polyglycols contain from about 1 to 10 ether oxygen atoms and these can be of the formula $H(OC_xH_{2x})_nOH$ where $x$ is 2 to 4. The preferred polyglycols are the polyethylene and polypropylene glycols and those particularly useful have molecular weights from about 150 to 450.

Di-2-ethylhexyl sebacate (Plexol 201) and diisooctyl azelate (DiOAz) are popular synthetic lubricant bases. DiOAz is a product made by the esterification of azelaic acid with an alcohol mixture made by the oxo process from $C_3$ to $C_4$ copolymer heptanes. This alcohol is commercially available as a mixture containing 17% 3,4-dimethylhexanol; 29% 3,5-dimethylhexanol; 25% 4,5-dimethylhexanol; 1.4% 5,5-dimethylhexanol; 16% of a mixture of 3-methylheptanol and 5-ethylheptanol; 2.3% 4-ethylhexanol; 4.3% alpha-alkyl alkanols and 5% other materials. Some other specific diesters are di-(1,3-methylbutyl) adipate, di-(2-ethylbutyl) adipate, di-(1-ethylpropyl) adipate, diethyl oxalate and di-(undecyl) sebacate.

A diester, complex ester or polyester alone may have the viscosity desired for a particular high-temperature application or the desired viscosity characteristics may be produced by blending two components together, altering the proportions of each until the goal is achieved. The blended lubricant can also include up to about one percent by weight of an oxidation inhibitor, such as phenothiazine and may also contain a foam inhibitor and up to about 0.1% free dicarboxylic acid, e.g. an aliphatic acid of 6 to 12 carbon atoms to improve its corrosion characteristics.

The lubricant blend may range in viscosity from the light to the heavy oils, e.g. about 30 SUS at 210° F. to 250 SUS at 210° F. and preferably 30 to 150 SUS at 210° F. Titanium polymers made according to this invention may be used to impart extreme pressure properties to these lubricants that is, to give high film strength to these lubricants so that they may be used in situations where high pressures occur, such as in certain gears and bearings. These high pressures would ordinarily cause rupture of the lubricant film, leading to contact of opposing metal surfaces and consequent scuffing, seizure, excessive wear, loss of efficiency, rise in internal heat and eventual failure of the mechanism. The following examples of the process of this invention are to be considered as illustrative only.

*Example I*

112 g. $TiCl_4$ were added to 250 g. of dry hexane. To this mixture 353 g. of a 5% solution of water in butanol were added at 20° C. This alcohol-water mixture was added slowly, over a period of one hour. Total water added was 17.6 g. Ammonia gas was added to the system to neutralize the HCl as formed; the resulting insoluble $NH_4Cl$ was filtered out of the light green solution which resulted. This solution was placed under 18 to 20 mm. Hg vacuum for two hours to remove the hexane. The resulting viscous butyl titanate polymer analyzed 16.6% Ti.

*Example II*

39 grams of tetra-2-ethylbutyl titanate and 40 grams of hydrated magnesium sulfate ($MgSO_4 \cdot 7H_2O$) were placed in a stoppered bottle and held at 0° C. for four hours. The bottle was agitated occasionally. After four hours the material had set up into a hard mass. Plexol 201 was added to this material and the insolubles removed by filtration. The titanium concentration of this clear polymer solution was 4.97%.

*Example III*

A one percent solution of water in 2-ethylhexanol was added dropwise to a flask containing 80 grams of tetra-2-ethylbutyl titanate in a closed system. A total of 400 grams of this alcohol solution was added to the titanate. A portion of this product (225 grams) was distilled under a vacuum of 15 mm. at a maximum temperature of 82° C. to remove the alcohol. 18 grams of titanium polymer were obtained as bottoms. 3 grams of this polymer were blended in 17 grams of Plexol 201 and filtered. The resultant titanium concentration was 3.31%. A "Plexol 201" sample containing 0.1% free sebacic acid and 0.03% of the titanium polymer of Example I (0.005% Ti) was tested for extreme pressure characteristics. The lubricant had a load carrying capacity of 3000 pounds on the Ryder Gear test machine. This value is sufficient to meet a proposed minimum military specification and, of course, the carrying capacity may be increased by including more of the titanium polymer in the finished lubricant. The titanium polymer content of the ester lubricant will be sufficient to give increased extreme pressure properties to the ester and will range, in general, from about 0.001 to 2% by weight, preferably about 0.01 to 1.2%.

We claim:

1. An ester of a carboxylic acid of 2 to 12 carbon atoms and of lubricating viscosity having incorporated therein, about 0.001 to 2%, an amount sufficient to give increased extreme pressure properties to the lubricant, of a titanium polymer made by the reaction of a reaction mixture selected from the group consisting of a mixture of a titanium ester of the type $Ti(OR)_4$ with a hydrated inorganic salt and mixtures of a titanium tetrachloride with about 0.25 to 4 moles per mole of titanium tetrachloride of an alcohol of the type ROH containing about 1 to 8% water, R being an alkyl group of 1–12 carbon atoms, and the water in each reaction mixture being about 0.25 to 2 moles per mole of titanium compound.

2. The lubricant of claim 1 which contains about 0.4 to 1.2% of the polymer.

3. The lubricant of claim 1 wherein the ester is di-2-ethylhexyl sebacate.

References Cited in the file of this patent
UNITED STATES PATENTS

| | | |
|---|---|---|
| 2,160,273 | Loane et al. | May 30, 1939 |
| 2,614,112 | Boyd | Oct. 14, 1952 |
| 2,689,858 | Boyd | Sept. 21, 1954 |
| 2,727,918 | Boyd | Dec. 20, 1955 |
| 2,789,092 | Cantrell et al. | Apr. 16, 1957 |
| 2,891,910 | Furey | June 23, 1959 |
| 2,960,469 | Young | Nov. 15, 1960 |
| 3,003,963 | Kay | Oct. 10, 1961 |